United States Patent [19]

Studer

[11] 3,829,038

[45] Aug. 13, 1974

[54] TAPE RECORDING TRANSPORT CONTROL SYSTEM

[76] Inventor: Willi Studer, Althardstrasse 150, Regensdorf, Switzerland

[22] Filed: Nov. 29, 1971

[21] Appl. No.: 202,903

Related U.S. Application Data

[63] Continuation of Ser. No. 812,208, April 1, 1969, abandoned.

[30] Foreign Application Priority Data

July 24, 1968 Switzerland ........ 11067/68

[52] U.S. Cl. ........ 242/190, 242/75.51, 242/203, 242/204, 318/7

[51] Int. Cl. .. B65h 25/22, B65h 25/06, B65h 25/32

[58] Field of Search ........ 242/189, 190, 186, 180, 242/182, 183, 184, 185, 201, 203, 202, 204, 205, 206, 207, 208, 209, 210, 75.51, 75.5, 75.3; 318/6, 7

[56] References Cited

UNITED STATES PATENTS

| | | | |
|---|---|---|---|
| 2,670,906 | 3/1954 | Daniels et al. | 242/75.51 |
| 3,251,563 | 5/1966 | Kleist et al. | 242/184 |
| 3,258,214 | 6/1966 | Comstock | 242/75.3 X |
| 3,311,313 | 3/1967 | Rayfield | 242/184 |
| 3,318,545 | 5/1967 | Tobey | 242/188 X |
| 3,347,481 | 10/1967 | Epstein et al. | 242/75.51 X |

*Primary Examiner*—George F. Mautz
*Attorney, Agent, or Firm*—Flynn & Frishauf

[57] ABSTRACT

A pair of tape tension sensors are included in the tape path, one each between reel and tape heads, and a motion sensing mechanism, such as a tachometer generator connected to an idler or a guide pulley, provides tension and motion, as well as direction of motion information; tension information is transmitted to pay out and take up motors to effect braking and wind-up, and, upon stopping, the motion sensor combined with tension sensors provides information controlling braking and drag of the motor to prevent tape spill, while maintaining proper tension on the tape during running.

7 Claims, 3 Drawing Figures

TAPE RECORDING TRANSPORT CONTROL SYSTEM

Figure 1:
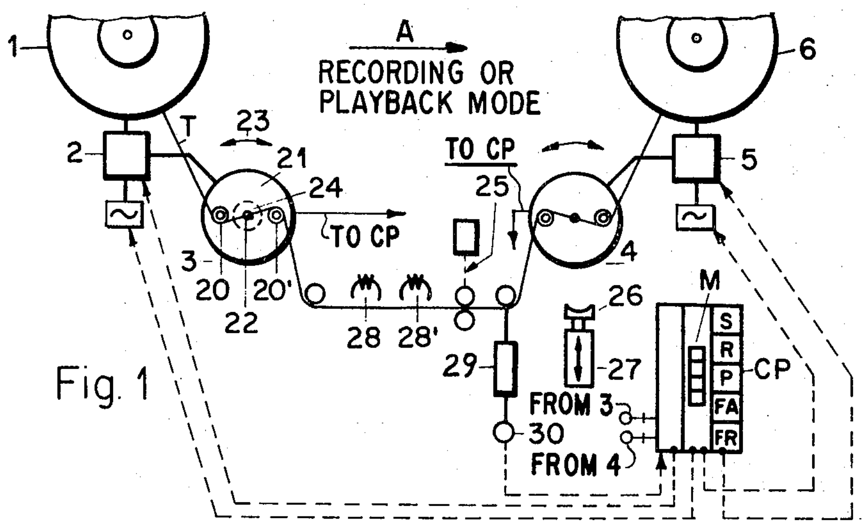

This application is a continuation of application Ser. No. 812,208, filed Apr. 1, 1969, now abandoned.

The present invention relates to recording tape transport control systems, and more particularly, to control systems for use with sound recording tape in which the forces on the tape during operation and switch-over from one mode of operation to another are maintained to be substantially equal.

High-quality professional tape recorders, particularly when used for initial recording of performances, for later re-recording or transcription on phonograph records, as well as for professional broadcast use, usually have three motors, one for each of the reels and one for the capstan drive. The requirements placed on the tape transport are high. Not only is it necessary that the tape transport is uniform, that is, moves the tape at absolutely uniform and even speed past the recording head, but further is readily adapted to studio use, that is, permits editing of tapes as well as accurate control of the timing of programs recorded thereon. The tape transport speed during recording or reproduction is usually relatively low; in addition, a speed range must be provided for fast forward and fast rewind transport at substantially higher speeds. Starting and stopping of the tape, both at low and at high speeds, should be as quickly as possible, and a quick change of mode of operation should be possible, without introducing equipment which may affect the inherent liability of the equipment. The mechanical loading, that is, strain, put on the recording tape may not be exceeded, even during high speed winding, and more particularly, during switch-over from start to stop, or forward to reverse. The resulting tape reels, as wound, must be uniform even if the diameter of the wound tape is large. The requirement for uniform winding, and uniform tension of winding, is particularly important when tapes are stored since the tapes deteriorate upon long-time storage if they are poorly spooled.

The above noted problems become particularly acute when tape is used which has a thin film base in order to obtain longer running time for given reel sizes, and which have smooth surfaces in order to improve the recording quality. Thin tape, and smooth outside surface, increase difficulties in spooling.

It has previously been proposed to insert a tape tension control between the capstan and the payout reel in order to improve the passage of the tape past the recording heads. It has also been proposed to supply the take-up reel motors with increased, or decreased, supply potentials, depending upon the mode of operation, that is, whether they are to operate at fast winding or recording speed in forward or backward direction, and to utilize electrical braking in order to improve the starting and stopping of the tape. The object has been always to insure a tape transport which is as even as possible, and further, to decrease the strain on the tape, particularly upon starting, stopping and change-over in direction or speed and to prevent stray loops, tape spill, as well as eventual uneven winding on the take-up spool.

It is an object of the present invention to further improve the tape transport of sound recording apparatus.

SUBJECT MATTER OF THE PRESENT INVENTION

The present invention is operable in systems which have, as is customary, three motors and the usual motor control switches. A pair of tape tension sensors are provided, one each arranged adjacent a spool, that is, between the spool and auxiliary guide rollers to guide the tape in front of the recording heads. The tape tension sensors provide tension sensing signals. In addition, movement and direction of movement of the tape are sensed, for example, by a tachometer generator connected to a guide roller or idler pulley. The tape tension signals, as well as the tape movement signals, are then logically interconnected to the motor controls and to the command signals from the control panel of the equipment itself to regulate drag or braking of the motors, as well as to control application of proper potentials for high speed or reproduction speed spooling. Sensing the tension of the tapes, and switching control of the sensed tension in accordance with a logical pattern depending upon the mode of operation, enables high speed operation, as well as fast switch-over of modes of operation while maintaining stresses on the tape at safe values.

Figure 2:
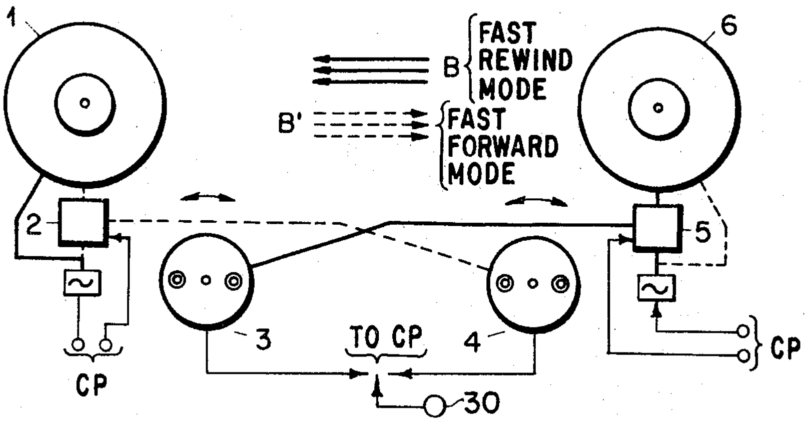
Figure 3:
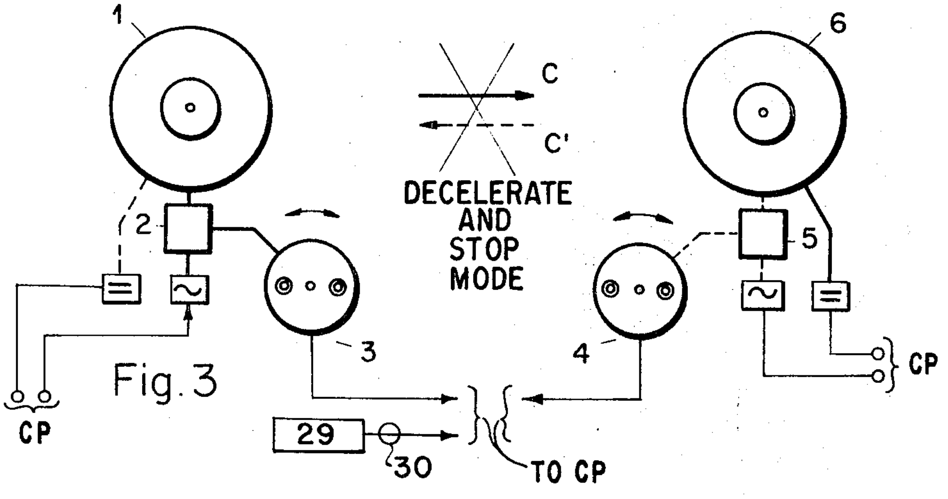

The invention will be described by way of example with reference to the accompanying drawings, wherein:

FIG. 1 illustrates, in schematic form, the system of the present invention and further, the electrical connection for normal speed operation, that is, for recording or playback;

FIG. 2 illustrates the electrical connections for the system of FIG. 1 which are established for fast forward or fast reverse spooling the tape, and associated tape driven or engaging devices being omitted; and FIG. 3 is an illustration of the electrical connection for the system of FIG. 1 which are established during a transient state, that is, during stop from forward transport of the tape; the tape, and associated tape driven or engaging devices are omitted.

The apparatus has the usual control panel CP, having a stop control button S, a record control R, playback control P, fast forward FF and fast rewind FR. Further, the control panel includes a length or elapsed running time counter M measuring the length or duration of running time of tape being reeled, and a switching unit, incorporating logic circuitry (preferably solid state), and not shown, but described in its complete function. The switching unit controls the logical interconnection of the various elements as illustrated in heavy lines in FIGS. 1, 2 and 3. The tape transport system further includes a pair of tension transducers which are connected to be responsive to the tension of the tape T, one each being associated with a reel of the tape. The type of tension balance illustrated in the drawing at 3, 4 (FIG. 1) has been found particularly suitable as a tape tension transducer or sensor. It is responsive to the length of a tape segment interposed between a tape reel and associated guide rollers to guide the tape to the recording head assembly. The tape tension balance includes a pair of guide rollers 20, 20' located diametrically opposite each other on the diameter of a carrier disc 21 which, pivotable over a pivot point 22 against the tension of a spring (not shown) is inserted in the path of the tape between supply reel and guide rollers. The tension to maintain the tension balance at a rest position can be obtained from a spiral spring, a lever acting against a compression or tension spring, or other mechanism well known in the art, motion being about the pivot point 22 in the direction of arrow 23 (FIG. 1); preferably, some damping means, also not shown and well known in the art, are provided to dampen spurious oscillations. The arrangement stores a certain length of tape, that is pivoting of rollers 20, 20′ about center 22 changes the total tape length between reel and recording head and the associated idler rollers. In addition, the pivoting movement about point 22 is transmitted by the tension balance to a transducer which supplies a tension sensing signal representative of tension and thus, stress on the tape. The transducer is responsive to pivoting motion (arrow 23) of the tape tension balance and may be a potentiometer, a contact-less Hall device, an inductor, a movable core in a coil, or the like; the output may be a straight analog output or a step output as desired. This tension sensing signal is then utilized to control the motors, as will be explained in detail below.

The tape control mechanism of the present invention includes a further transducer or sensing device associated with the tape. The third transducer is utilized particularly during transient changes of modes of operation, for example, from a fast forward or normal speed forward to stop operation. The transducer supplies a signal which indicates the motion of the tape, and the direction of tape motion, or conversely, that the tape is stopped. A particularly suitable transducer is a photoelectric or magnetic tachometer generator, coupled to be driven by motion of the tape; an example is shown in FIG. 1, where a tachometer generator is connected to idler or guide rollers. The absence or presence of a pulse train from the tachometer generator will indicate rest or movement of the recording tape. These pulses, connected and applied to control panel CP may be used not only for control of the tape transport, but also to indicate the direction of movement as well as to count the tape running off the reels to control counter M on control panel CP.

Referring now particularly to FIG. 1: motor 1 is supplied from a source of alternating current over a motor control arrangement 2. Motor control arrangement 2 may, for example, be a rectifier bridge having a control transistor in one diagonal, a thyristor circuit or the like, which can be controlled by a control connection. This control connection is obtained from the transducer element connected to tape tension balance 3. The path of the tape T through the recording head assembly, the idler rollers, and capstan is not shown in detail since it is well known; a pair of idler rollers guide the tape T past the normally used set of magnetic heads, of which two are shown at 28, 28′ and a capstan connected to the motor, shown schematically at assembly 25, against the other side of which a roller is urged, as known. The shaft of an idler or guide roller is connected to a tachometer generator 29 to signal movement of the tape, the output of the tachometer generator being obtained from terminal 30. Terminal 30 is connected to the logic circuit of the control panel CP, for logical connection of the transducers of the system as will be explained further in connection with FIGS. 2 and 3 as well as with remainder of FIG. 1.

The arrangement at the left side of FIG. 1 is essentially duplicated at the right; a tension balance 4, in all respects similar to that of tension balance 3 and having an associated transducer (not especially shown or identified) supplies a control potential to a motor controller 5, which controls a reel motor 6 supplied from a source of alternating current.

FIG. 1 shows in heavy lines operation of the normal forward speed, that is, either for recording or playback. Let it be assumed that the direction of tape motion is in accordance with arrow A. Either the R or the P control of the console CP will be operated. If, for example, the tension balance 4 moves in the direction which indicates a lesser tension, that is, an increase in size of the tape loop, then control 5 will be so controlled that motor 6 receives an increased potential, thus increasing the speed and tension until the proper value has been attained. Similarly, tape tension is reduced when the tension balance tends to move in the opposite direction. The final result thus provides constant tape tension for reeling independent of diameter of the tape on the reel itself. The pay-out side is controlled similarly. Constant tape tension is obtained in this case by controlling the drag of motor 1, which, to control even payout of the tape, furnishes a torque opposite to that of tape movement.

Operation of the switch FF (fast forward) will cause tape movement in accordance with arrows B, FIG. 2; three arrows are illustrated to schematically indicate the higher speed. Operation of the switch FR (fast reverse) causes operation in accordance with arrows B. Let it be assumed that switch FR has been operated, so that the system will be in the "fast rewind" mode (solid arrows B). The logic unit will then establish circuits in accordance with the heavy lines shown in FIG. 2. Motor 1 will operate as a take-up motor, and is supplied with an increased potential for fast rewind. The control unit 2 of the motor itself is disconnected. The tension balance 3, that is, the one associated with the take-up reel is connected to control, over motor controller 5, the drag exerted by motor 6 on the tape as it is being paid out. Tension balance 4 does not have any control functions in this mode. By utilizing tension balance 3 as the controlling balance for the pay-out reel on motor 6, the tension balance will sense not only the tension of the tape itself as it is being pulled by the motor 1 but also tension due to friction of the tape through the recording head assembly, over idler and guide rollers and the like, which friction may be substantial at high speed. It is possible to control the counter torque of motor 6 also by the tension balance 4; however, the reliability of the arrangement, as well as the uniformity of the tape as spooled on the reel is improved by utilizing the arrangement as shown in FIG. 2.

If the direction of fast reeling is to be forward, that is, from left to right, FIG. 2 (arrows B′), switch FF is operated, and then the connection will be as shown by dotted lines and the full line circuit will be disconnected.

The switching arrangement under transient conditions, and particularly under a stop condition is illustrated in FIG. 3, where stopping a tape previously moving in the direction of the arrow C is indicated, and graphically shown by the crossed off arrow. The full lines between motor 1, controller 2 and balance 3 show the electrical connections. The speed of movement of the tape itself is not material, that is, the tape can move at recording or playback speed, or on fast forward. Thus, upon operation of the "stop" (S) button of the control console CP, with the tape previously moving in the direction of the arrow C will cause a circuit as illustrated in FIG. 3 to be established in the switching unit. The motor 1 on the reel which is the pay-out reel is controlled over its motor controller 2 by tension sensed by the tension balance 3 at the pay-out side to apply an appropriate drag torque. This control prevents tape spill upon sudden stopping of the motor 6. The deceleration of the motors 1, 6 may be different; the tension balance 3 will immediately sense any drop in tension and increase the drag or counter torque on motor 1, over controller 2 before excess tape can be supplied from the reel connected to motor 1. To stop the motor 6, a braking potential is placed directly thereon, as schematically indicated by connection of motor 6 to a source of direct current supply, which causes a controlled rapid stopping of the motor 6 and its associated reel. This almost instantaneous stopping is made possible because tape spill is avoided by the tension control from tension balance 3 over to motor 1. The tension balance 4 is not connected in this mode of operation, since balance 3 will sense any loss of tension and prevent spill of tape.

If the tape had been running in the fast rewind direction, that is, in the direction of arrow C′ then the circuits would be established as indicated by the broken lines in FIG. 3, the solid line circuit being disconnected.

The control effected by the circuit of the present invention is not merely a stop control, but rather regulation of dynamic acceleration, deceleration, and stopping (or switch-over to different mode) obtained by logical interaction of the signals from the tension balances together with signals responsive to motion or absence of motion, of the tape itself, as well as to its direction of transport. As an illustration, let it be assumed that the tape is running at fast rewind (arrows B, FIG. 2) and that the operator thereupon presses a record or playback button, R or P, for forward motion at normal speed so that the eventual switching connections will be established in accordance with the heavy lines in FIG. 1. Upon changeover, the logic circuit will first cause a stop operation so that the first mode of switching will change from the circuit of FIG. 2 to the circuit of FIG. 3, broken lines. The circuit connections and the switches to carry out this change-over are not illustrated in detail since changing of physical connections by selective switching by means of solid state circuitry is well known in the art and can readily be prepared by any design engineer. Thus, the system will first go to a brake mode as previously described in connection with FIG. 3 (but in reverse, that is in connection with the arrow C′). As soon as the tape is stopped, that is as soon as the tachometer generator 29 no longer supplies pulses over terminal 30 to the logic circuitry, the control connections as indicated in the heavy lines of FIG. 1 will be established as commanded by the R, or P button of control console CP. This switchover is accomplished in sequence and in the shortest possible time without undue stress on the tape. Initially, for fast rewind, there will be application of a first higher voltage (for example, a direct connection to mains) for fast rewind to the left motor 1, and drag potential under control of left tension balance 3 on the right motor 6 (see FIG. 2). Then, connection of braking potential to the motor 1 (FIG. 3 dotted lines) until the tape is stopped as sensed by tachometer generator 29; additionally there will be application of countertorque, or drag potential to the right motor 6, under control of the right tension balance 4, but only during the time when braking potential is applied to left motor 1. Thereafter, steady state operating connection will ensue, in accordance with the heavy lines of FIG. 1. Suitable indicator lamps can be operated by the switch-over mechanism of the control circuits.

The present invention not only permits rapid change of the mode of operation, with minimum stress on the tape, but also enables increase of change-over speed. It has been customary, when controls enabled switch-over from one mode of operation to another, to provide a certain time delay to enable the entire apparatus to come to rest. These time delays were usually controlled by electrical time circuits, set for predetermined time periods which were selected to be longer than the longest time taken by any element, in order to have a reasonable margin of safety. In accordance with the present invention, however, the time period for switching over from one mode of operation to another is controlled entirely by the time needed for start and/or stop operations, and is thus independent of external timers.

Editing of recorded tapes requires that specific points of the recording can be identified, in order to cut the tape at the points and to check the position of tape splices. Operating a recording system for cutting and editing thus requires the capability to move the tape forward or backward at selected speed, either driven by motors or even by hand. A point on the tape, once determined must be identifiable again without lateral shift as soon as the motor stops, or hand operation of the tape ceases. In order to avoid shifts which might arise due to motion of the tension balances in consequence of their spring action over their pivot points, means are provided to lock the tension balances automatically in a predetermined position. Referring again to FIG. 1, where such locking means are illustrated in connection with the right-hand balance 4 only (for ease of illustration), a brake shoe 26, movable by a solenoid 27 in the direction of arrows is provided to lock the balance in a predetermined rest position. Under such operation, the motors 6 are then not controlled by the position of the balances, but rather by a manually controlled switch for slow motor motion or tape movement by hand, not described in detail since it is well known in the art. Upon switchover to manual control, brake shoe 26 (and its counter part on the tension balance on the left-hand balance arrangement) is moved against the disc 4 to lock the disc in a position determined by the tape loops at the very time moment. This position is preferably intermediate to the end or terminal positions of the balance, so that change to automatic mode, coupled with a quick release of brake shoe 26 will immediately place the apparatus in readiness and to assume control over the regulating functions as previously set forth.

The present invention has been illustrated and described in connection with a sound tape recording transport control system, but is of course equally applicable to transport control systems for other uses, such as recording of digital data and information. Various structural changes and modifications, as determined by the requirements of particular applications or uses may be made without departing from the inventive concept.

I claim:

1. Recording tape transport control system having a pair of reels alternately capable of being pay-out and take-up reels;

a capstan (25) engaging said tape, and a capstan drive motor therefore driving the capstan;

a pair of reversible electric motors (1, 6), one each connected to and associated with each reel, each capable of being energized to operate in a driving mode to drive its associated reel when the associated reel is in take-up mode of operation and capable of being energized to operate in a braking mode to apply a drag force when the associated reel is in pay-out mode of operation, said system comprising tape motion sensing means (29) coupled to the tape to sense presence, or absence, and direction of tape movement and providing respective discrete electrical tape motion signals indicative respectively, of forward motion, reverse motion, and stopping of the tape;

a pair of tension sensors (3, 4) located at opposite sides of the capstan in the path of the tape and coupled to the tape to sense tape tension between the capstan and the respective tape reel and providing respective electric tension sensing signals;

motor control means (2, 5) controlling motor mode of operation;

motor operation command means (CP) connected to said tape motion sensing means (29) and to the tension sensors (34), and responsive to the tape motion signals as well as to the tape tension sensing signals, said command means establishing circuits to said motor control means to control motor operation according to commanded mode of operation to control, selectively, the operation of the motors, in either direction, for record-playback, fast spooling, to decelerate and stop, as well as during change-over in direction of tape motion, and to keep the forces acting on the tape constant during transient operating conditions, wherein for fast forward or fast re-wind mode of operation (FIG. 2), said command means (CP) effects connection of said motor control means (2, 5) to connect the pay-out motor to provide counter-torque or drag by the motor, the counter-torque or drag being controlled by tension sensing signals derived from the respective tension sensor (3, 4) located between the take-up reel and the capstan (25), whereby the sensor between the take-up reel and the capstan will control the drag applied by the pay-out motor;

and said command means (CP) effects connection of said motor control means (2, 5) to connect the take-up motor to a source of potential of sufficient level to cause fast mode of operation of the take-up motor, whereby the take-up motor will be operated at high speed, and tension on the tape adjacent the take-up reel will be controlled.

2. System according to claim 1, wherein sources of potential for high-speed operation and for braking, respectively, of the motors are provided;

and wherein the motor command means (2, 5; CP) is responsive to characteristics of the tape motion signal from the tachometer generator and logically controls the application of said respective potential sources in accordance with the sensed direction of tape movement and the manual setting of the command means (CP), to the respective motors.

3. Recording tape transport control system having a pair of reels alternately capable of being pay-out and take-up reels;

a capstan (25) engaging said tape, and a capstan drive motor therefore driving the capstan;

a pair of reversible electric motors (1, 6), one each connected to and associated with each reel, each capable of being energized to operate in a driving mode to drive its associated reel when the associated reel is in take-up mode of operation and capable of being energized to operate in a braking mode to apply a drag force when the associated reel is in pay-out mode of operation, said system comprising tape motion sensing means (29) coupled to the tape to sense presence, or absence, and direction of tape movement and providing respective discrete electrical tape motion signals indicative respectively, of forward motion, reverse motion, and stopping of the tape, a pair of tension sensors (3, 4) located at opposite sides of the capstan in the path of the tape and coupled to the tape to sense tape tension between the capstan and the respective tape reel and providing respective electric tension sensing signals;

motor control means (2, 5) controlling motor mode of operation;

motor operation command means (CP) connected to said tape motion sensing means (29) and to the tension sensors (34), and responsive to the tape motion signals as well as to the tape tension sensing signals, said command means establishing circuits to said motor control means to control motor operation according to commanded mode of operation to control, selectively, the operation of the motors, in either direction, for record-playback, fast spooling, to decelerate and stop, as well as during change-over in direction of tape motion, and to keep the forces acting on the tape constant during transient operating conditions, wherein for change-over from running to stop, (FIG. 3)

said command means (CP) effects connection of said motor control means (2, 5) to connect the pay-out motor to provide counter-torque or drag by the motor, the counter-torque or drag being controlled by tension sensing signals derived from the respective tension sensor (3, 4) located between the pay-out reel and the capstan (25), and said command means (CP) effects connection of said motor control means (2, 5) to connect the take-up motor to cause application of braking potential to the take-up motor.

4. System according to claim 3, wherein sources of potential for high-speed operation and for braking, respectively, of the motors are provided;

and wherein the motor command means (2, 5; CP) is responsive to characteristics of the tape motion signal from the tachometer generator and logically controls the application of said respective potential sources in accordance with the sensed direction of tape movement and the manual setting of the command means (CP), to the respective motors.

5. Recording tape transport control system having a pair of reels alternatively capable of being pay-out and take-up reels;

a capstan (25) engaging said tape, and a capstan drive motor therefore driving the capstan;

a pair of reversible electric motors (1, 6), one each connected to and associated with each reel, each capable of being energized to operate in a driving mode to drive its associated reel when the associated reel is in take-up mode of operation and capable of being energized to operate in a braking mode to apply to drag force when the associated reel is in pay-out mode of operation, said system comprising tape motion sensing means (29) coupled to the tape to sense presence, or absence, and direction of tape movement and providing respective discrete electrical tape motion signals indicative respectively, of forward motion, reverse motion, and stopping of the tape;

a pair of tension sensors (3, 4) located at opposite sides of the capstan in the path of the tape and coupled to the tape to sense tape tension between the capstan and the respective tape reel and providing respective electric tension sensing signals;

motor control means (2, 5) controlling motor mode of operation;

motor operation command means (CP) connected to said tape motion sensing means (29) and to the tension sensors (34), and responsive to the tape motion signals as well as to the tape tension sensing signals, said command means establishing circuits to said motor control means to control motor operation according to commanded mode of operation to control, selectively, the operation of the motors, in either direction, for record-playback, fast spooling, to decelerate and stop, as well as during change-over in direction of tape motion, and to keep the forces acting on the tape constant during transient operating conditions, and wherein said motor command means (CP) has manually settable means (S, R, P, FA, FR) to control speed and direction of tape motion; wherein said motor command means (CP), upon commanded change-over of direction of movement of the tape with respect to movement of the tape as sensed by said tape motion sensing means (29) and represented by said tape motion sensing signal, first commands a "stop" mode of operation, and effects connection of the motor control means of the pay-out motor to connect the pay-out motor to provide a counter-torque or drag by the motor the counter-torque or drag being controlled by tension sensing signals derived from the respective tension sensor (3, 4) located between the pay-out reel and the capstan (25), and further effecting connection of the motor control means of the take-up motor to connect the take-up motor to cause application of braking potential to the take-up motor, to cause the tape to stop;

then, when the tape motion signal indicative of absence of tape motion as sensed by said tape motion sensing means (29), is sensed by said motor operation command means (CP), said motor command means connects the respective motor control means to said respective motors to control the mode of operation of the motors in the respective commanded mode under control of the respective tension sensor (3, 4), or sensors, as entered in the command means, whereby upon commanded change of direction of movement of tape, the tape is first brought to a stop under tension-controlled conditions and, only after having stopped as sensed by said tape motion signal, will force tending to move the tape in the commanded, reversed direction be imparted thereto to prevent application of a pulling force commanded by the reversal of direction of tape motion on the tape counter the direction of instantaneous movement of the tape.

6. System according to claim 5, wherein sources of potential for high-speed operation and for braking, respectively, of the motors are provided;

and wherein the motor command means (2, 5; CP) is responsive to characteristics of the tape motion signal from the tachometer generator and logically controls the application of said respective potential sources in accordance with the sensed direction of tape movement and the manual setting of the command means (CP), to the respective motors.

7. System according to claim 5, wherein the tape motion sensing means provides pulse-type signals forming said tape motion signals;

and said motor command means (CP) is responsive to the pulse signals to control the instant of change in connection of respective potential sources to said motors, and thus control the interlock intervals upon change-over of operating modes of said motors.

* * * * *